(12) United States Patent  (10) Patent No.: US 8,738,404 B1
Burns et al.  (45) Date of Patent: May 27, 2014

(54) SYSTEM AND METHOD FOR PROCESSING AN INSURED PROPERTY LOSS

(75) Inventors: Michael Burns, San Antonio, TX (US); Exiquio Pena Barrera, San Antonio, TX (US); Mark Alan Blair, San Antonio, TX (US); Jerod Jones Laughlin, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1011 days.

(21) Appl. No.: 11/321,968

(22) Filed: Dec. 29, 2005

(51) Int. Cl.
  *G06Q 40/00* (2012.01)
(52) U.S. Cl.
  USPC ............................................. 705/4; 705/35
(58) Field of Classification Search
  USPC ........................................... 705/35, 4
  See application file for complete search history.

(56) References Cited

U.S. PATENT DOCUMENTS

| | | | |
|---|---|---|---|
| 5,950,169 A | 9/1999 | Borghesi et al. | |
| 6,898,574 B1 | 5/2005 | Regan | |
| 7,203,654 B2 * | 4/2007 | Menendez | 705/4 |
| 2003/0120588 A1 * | 6/2003 | Dodd et al. | 705/38 |
| 2004/0148204 A1 | 7/2004 | Menendez | |
| 2004/0186750 A1 | 9/2004 | Surbey et al. | |
| 2005/0222947 A1 | 10/2005 | Regan | |
| 2006/0218018 A1 * | 9/2006 | Schmitt | 705/4 |
| 2007/0100669 A1 * | 5/2007 | Wargin et al. | 705/4 |

OTHER PUBLICATIONS

"U.S. Appl. No. 11/321,911, Advisory Action mailed Jun. 9, 2008", 3 pgs.
"U.S. Appl. No. 11/321,911, Examiner Interview Summary mailed May 29, 2009", 2 pgs.
"U.S. Appl. No. 11/321,911, Final Office Action mailed Mar. 6, 2009", 6 pgs.
"U.S. Appl. No. 11/321,911, Final Office Action mailed Apr. 4, 2008", 6 pgs.
"U.S. Appl. No. 11/321,911, Non Final Office Action mailed Sep. 3, 2009", 10 pgs.
"U.S. Appl. No. 11/321,911, Non Final Office Action mailed Sep. 18, 2008", 6 pgs.
"U.S. Appl. No. 11/321,911, Non Final Office Action mailed Sep. 24, 2007", 5 pgs.
"U.S. Appl. No. 11/321,911, Preliminary Amendment Apr. 24, 2006", 3 pgs.
"U.S. Appl. No. 11/321,911, Response filed May 28, 2008 to Final Office Action mailed Apr. 4, 2008", 10 pgs.
"U.S. Appl. No. 11/321,911, Response filed Jun. 8, 2009 to Final Office Action mailed Mar. 6, 2009", 16 pgs.
"U.S. Appl. No. 11/321,911, Response filed Dec. 3, 2009 to Non Final Office Action mailed Sep. 3, 2009", 14 pgs.
"U.S. Appl. No. 11/321,911, Response filed Dec. 15, 2008 to Non Final Office Action mailed Sep. 18, 2008", 8 pgs.
"U.S. Appl. No. 11/321,911, Response filed Dec. 21, 2007 to Non Final Office Action mailed Sep. 24, 2007", 10 pgs.
"U.S. Appl. No. 11/322,138, Non-Final Office Action mailed Jan. 4, 2010", 6 pgs.

(Continued)

*Primary Examiner* — Lalita M Hamilton
(74) *Attorney, Agent, or Firm* — Baker Hostetler LLP

(57) ABSTRACT

Disclosed are systems and methods for processing an insured property loss. The systems and methods communicate with an insured property owner and process an insured property loss of the insured property owner by recording a plurality of details of the insured property loss by selecting a plurality of insured property loss details data from a plurality of structured insured property loss detail menus.

27 Claims, 16 Drawing Sheets

(56) References Cited

OTHER PUBLICATIONS

"U.S. Appl. No. 11/322,138, Advisory Action mailed Jun. 5, 2008", 3 pgs.
"U.S. Appl. No. 11/322,138, Final Office Action mailed Mar. 20, 2008", 6 pgs.
"U.S. Appl. No. 11/322,138, Final Office Action mailed Jun. 9, 2009", 11 pgs.
"U.S. Appl. No. 11/322,138, Non Final Office Action mailed Sep. 24, 2007", 5 pgs.
"U.S. Appl. No. 11/322,138, Non Final Office Action mailed Oct. 27, 2008", 9 pgs.
"U.S. Appl. No. 11/322,138, Preliminary Amendment filed Apr. 24, 2006", 3 pgs.
"U.S. Appl. No. 11/322,138, Response filed Feb. 27, 2009 to Non Final Office Action mailed Oct. 27, 2008", 13 pgs.
"U.S. Appl. No. 11/322,138, Response filed May 28, 2008 to Final Office Action mailed Mar. 20, 2008", 10 pgs.
"U.S. Appl. No. 11/322,138, Response filed Oct. 9, 2009 to Final Office Action mailed Jun. 9, 2009", 15 pgs.
"U.S. Appl. No. 11/322,138, Response filed Dec. 21, 2007 to Non Final Office Action mailed Sep. 24, 2007", 10 pgs.

* cited by examiner

SYSTEM AND METHOD FOR PROCESSING AN INSURED PROPERTY LOSS

This application is related to 1) U.S. application Ser. No. 11/321,911 filed on Dec. 29, 2005, and 2) U.S. application Ser. No. 11/322,138 filed Dec. 29, 2005, which are incorporated herein by reference in their entirety.

FIELD OF THE DISCLOSURE

Various embodiments of the disclosure pertain to a system and method for processing an insured property loss and, more particularly, to a system and method which communicate with an insured property owner and process an insured property loss of the insured property owner by recording a plurality of details of the insured property loss by selecting a plurality of insured property loss details data from a plurality of structured insured property loss detail menus.

BACKGROUND

The processing of an insured property loss is well-known and readily appreciated by those of skill in the art. Typically, a claims handler communicates with the owner of insured property and enters the details of the insured property loss into a database in a free-text format, for example, which is essentially a narrative of the details of the insured property loss.

The entry of the insured property loss into a database in the free text format raises a number of issues. When reviewing the property loss report, claim handlers and managers search through the typically lengthy narrative text summaries describing the insured property loss. This raises particular issues with respect to responding to updates to the insured property loss and reporting the current status of the insured property loss.

Accordingly, it would be desirable to provide a system and method for processing an insured property loss absent the disadvantages discussed above.

SUMMARY

Various embodiments of the present disclosure are directed to systems and methods for processing an insured property loss. The systems and methods provide techniques for communicating with an insured property owner and processing an insured property loss of the insured property owner, the processing including recording a plurality of details of the insured property loss by selecting a plurality of insured property loss details data from a plurality of structured insured property loss detail menus.

BRIEF DESCRIPTION OF THE DRAWINGS

FIG. 1b is a schematic view illustrating an embodiment of an information handling system used with the system for processing an insured property loss of FIG. 1a.

FIG. 2 is a schematic view illustrating an embodiment of a provider used in the system for processing an insured property loss of FIG. 1a.

FIG. 3c is a screen shot illustrating an embodiment of a first structured insured property loss details menu used in the method for processing an insured property loss for FIGS. 3a and 3b.

FIG. 3d is a screen shot illustrating an embodiment of a second structured insured property loss details menu used in the method for processing an insured property loss for FIGS. 3a and 3b.

FIG. 3e is a screen shot illustrating an embodiment of a second structured insured property loss details menu used in the method for processing an insured property loss for FIGS. 3a and 3b.

FIG. 3f is a screen shot illustrating an embodiment of a second structured insured property loss details menu used in the method for processing an insured property loss for FIGS. 3a and 3b.

FIG. 3g is a screen shot illustrating an embodiment of a second structured insured property loss details menu used in the method for processing an insured property loss for FIGS. 3a and 3b.

FIG. 3h is a screen shot illustrating an embodiment of a second structured insured property loss details menu used in the method for processing an insured property loss for FIGS. 3a and 3b.

FIG. 3i is a screen shot illustrating an embodiment of a insured property loss summary screen used in the method for processing an insured property loss for FIGS. 3a and 3b.

FIG. 3j is a screen shot illustrating an embodiment of a insured property loss summary screen used in the method for processing an insured property loss for FIGS. 3a and 3b.

FIG. 3k is a screen shot illustrating an embodiment of a insured property loss summary screen used in the method for processing an insured property loss for FIGS. 3a and 3b.

DETAILED DESCRIPTION

Figure 1A:
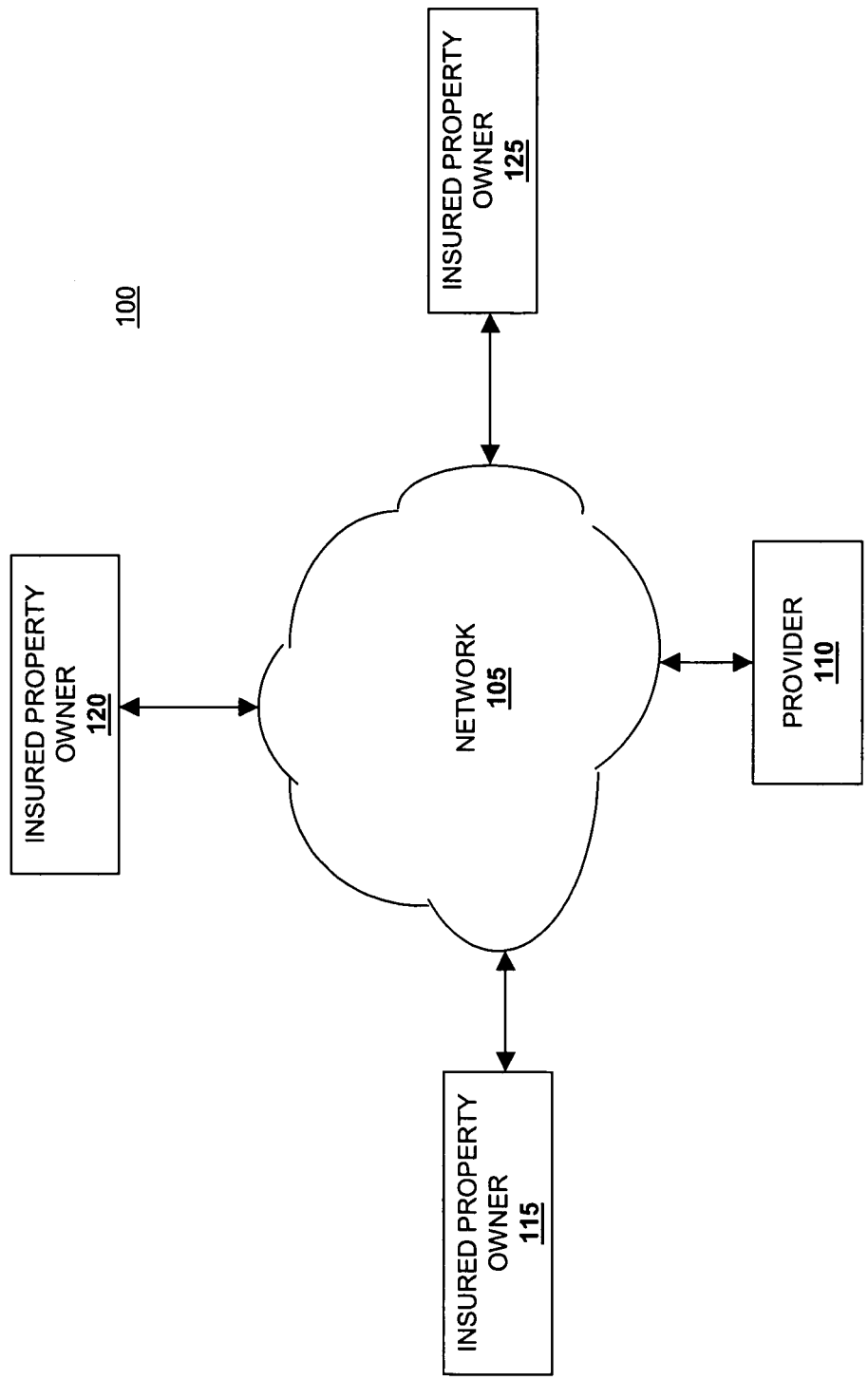
FIG. 1a is a schematic view illustrating an embodiment of a system for processing an insured property loss.

Referring now to FIG. 1a, in one embodiment, a system for outage avoidance 100 is illustrated. The system 100 includes a computer network 105 such as, for example, a Transport Control Protocol/Internet Protocol (TCP/IP) network (e.g., the internet or an intranet). A provider 110 is operably coupled to the network 105. A plurality of insured property owners 115, 120, and 125 are also operably coupled to the network 105 in order to allow communication between the insured property owners 115, 120, and 125 and the provider 110. In an embodiment, the provider 110 includes an insurance provider. In an embodiment, the provider 110 includes a membership organization which provides a plurality of services for its members including insurance. In an embodiment, the provider 110 includes anyone providing services related to claims to an insured property loss. In an embodiment, the insured property owners 115, 120, and 125 may be the owner of insured property which is insured by the provider 110 or a person who is authorized to report an insured property loss for an owner of insured property which is insured by the provider 110. In an embodiment, the insured property owners 115, 120, and 125 are a person with a claim or a potential claim against an insurance policy provided by the provider 110.

Each of the provider 110 and the insured property owners 115, 120, and 125 includes a respective network interface for communicating with the network 105 (e.g., outputting information to, and receiving information from, the network 105), such as by transferring information (e.g., instructions, data, signals) between such applicants and the network 105. Accordingly, through the network 105, the provider 110 communicates with the insured property owners 115, 120, and 125, and the insured property owners 115, 120, and 125 communicate with the provider 110.

For clarity, FIG. 1a depicts only one provider 110. However, the system 100 may include a plurality of providers. Likewise, for clarity, FIG. 1a depicts only three insured property owners 115, 120, and 125. However, the system 100 may include a plurality of insured property owners. In the discussion below, the insured property owner 115 is a representative one of the insured property owners 115, 120, and 125.

Each of the provider 110 and the insured property owners 115, 120, and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHS's are coupled to each other. Accordingly, the provider 110 and the insured property owners 115, 120, and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 105).

Figure 1B:
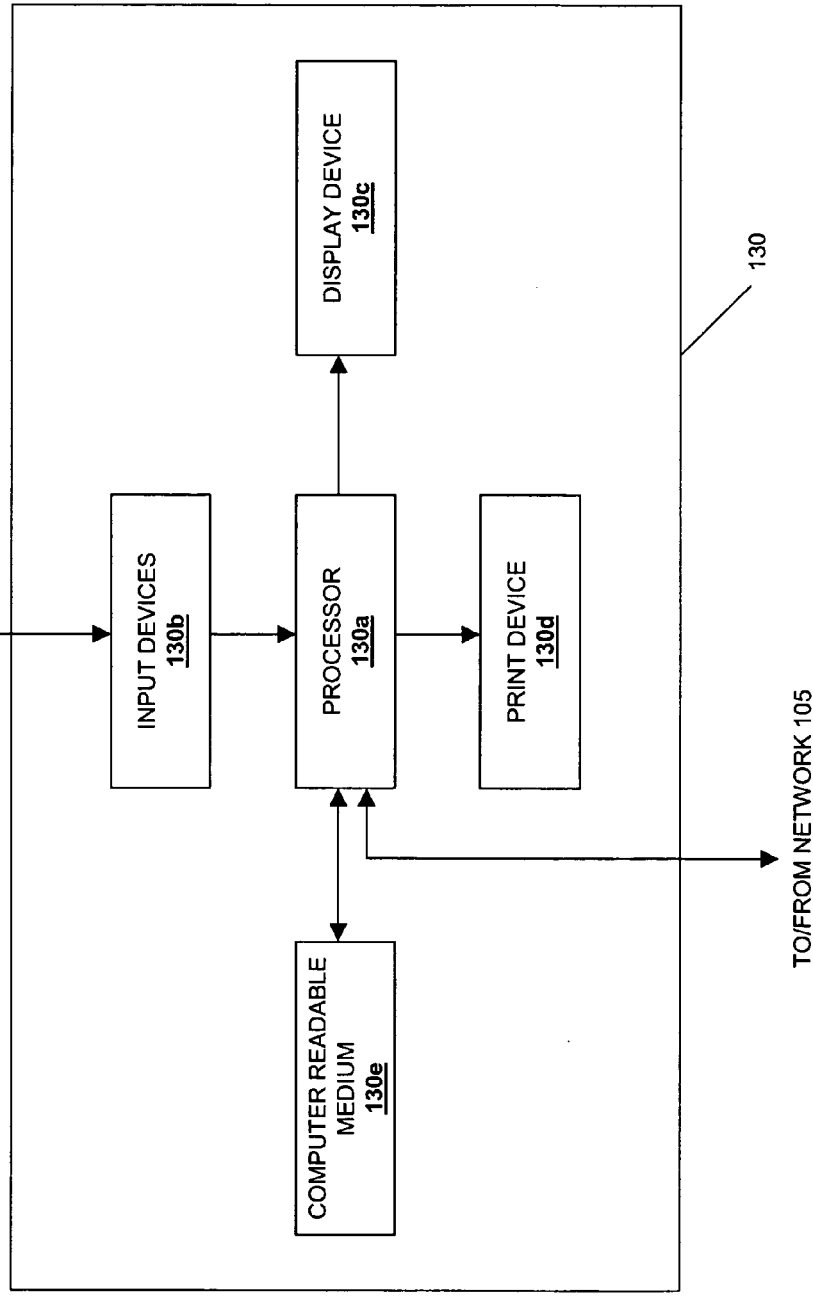

Referring now to FIG. 1b, an IHS 130 which is representative of one of the IHS's described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer-readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer-readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer-readable medium 130e and the processor 130a are structurally and functionally interrelated with one another as described below in further detail. Each IHS of the illustrative embodiment is structurally and functionally interrelated with a respective computer-readable medium, similar to the manner in which the processor 130a is structurally and functionally interrelated with the computer-readable medium 130e. In that regard, the computer-readable medium 130e is a representative one of such computer-readable media including, for example, but not limited to, a hard disk drive.

The computer-readable medium 130e stores (e.g., encodes, records, or embodies) functional descriptive material (e.g., including but not limited to software (also referred to as computer programs or applications) or data structures). Such functional descriptive material imparts functionality when encoded on the computer-readable medium 130e. Also, such functional descriptive material is structurally and functionally interrelated to the computer-readable medium 130e.

With such functional descriptive material, data structures define structural and functional interrelationships between such data structures and the computer-readable medium 130e (and other aspects of the system 100). Such interrelationships permit the data structures' functionality to be realized. Also, within such functional descriptive material, computer programs define structural and functional interrelationships between such computer programs and the computer-readable medium 130e (and other aspects of the system 100). Such interrelationships permit the computer programs' functionality to be realized.

For example, the processor 130a reads (e.g., accesses or copies) such functional descriptive material from the computer-readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer-readable medium) for causing the processor 130a to perform additional operations (as described elsewhere herein). Accordingly, such functional descriptive material exhibits a functional interrelationship with the way in which processor 130a executes its processes and performs its operations.

Further, the computer-readable medium 130e is an apparatus from which the computer application is accessible by the processor 130a, and the computer application is processable by the processor 130a for causing the processor 130a to perform such additional operations. In addition to reading such functional descriptive material from the computer-readable medium 130e, the processor 130a is capable of reading such functional descriptive material from (or through) the network 105 which is also a computer-readable medium (or apparatus). Moreover, the memory device of the IHS 130 is itself a computer-readable medium (or apparatus).

Figure 2:
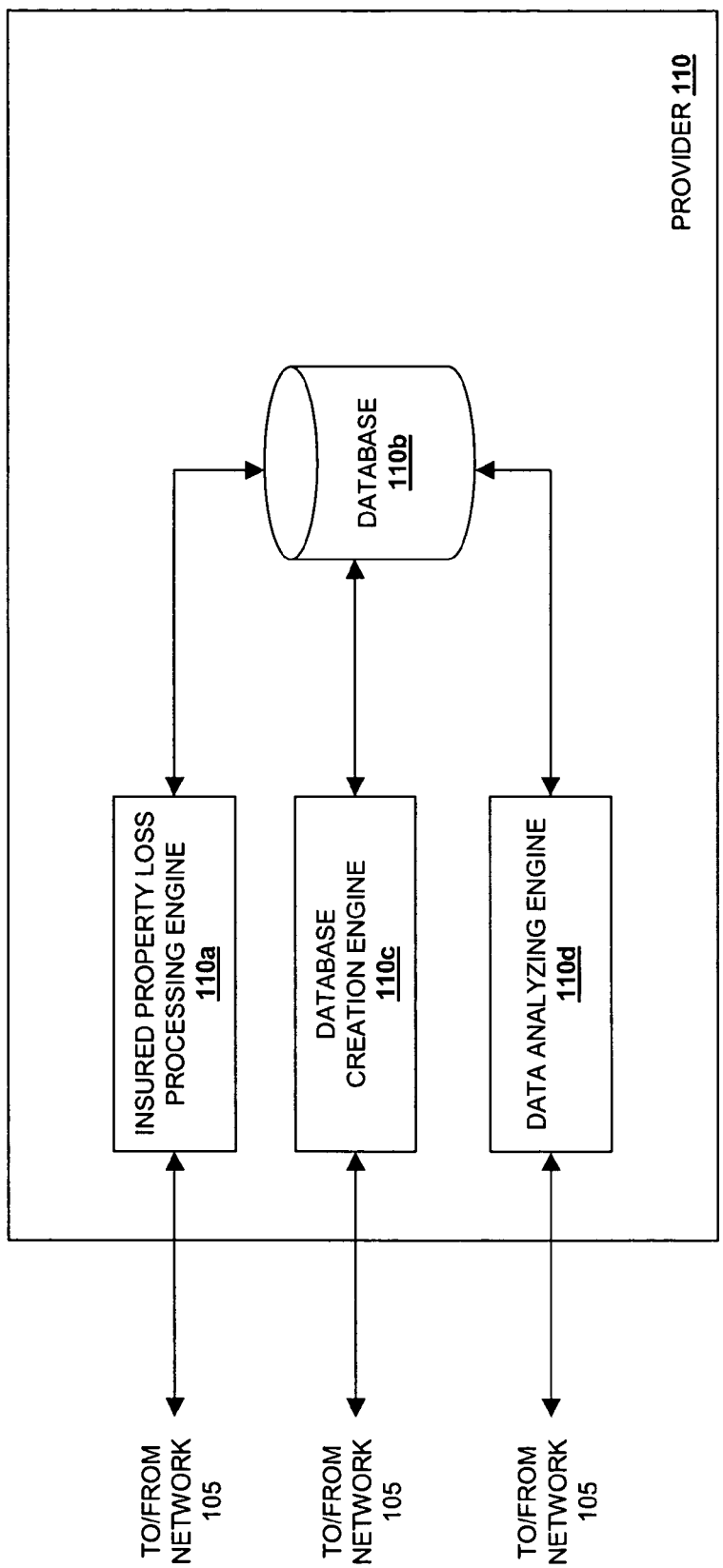

Referring now to FIG. 2, the provider 110 is illustrated in more detail. A insured property loss processing engine 110a which may be, for example, stored on a computer-readable medium known in the art, is included in the provider 110 and is operably coupled to the network 105, described above with reference to FIG. 1, and to a database 110b. A database creation engine 110b, which may be, for example, stored on a computer-readable medium known in the art, is included in the provider 110 and is operably coupled to the network 105, described above with reference to FIG. 1, and to the database 110b. A data analyzing engine 110d, which may be, for example, stored on a computer-readable medium known in the art, is included in the provider 110 and is operably coupled to the network 105, described above with reference to FIG. 1, and to the database 110b. In an embodiment, the database 110b may be located outside of the provider 110 and still operably coupled to the provider 110, the insured property loss processing engine 110a, the database creation engine 110c, and the data analyzing engine 110d. In an embodiment, the database 110c includes a plurality of databases relating to a plurality of previously reported insured property losses. In an embodiment, the database 110c includes a variety of previously collected information on insured property owners such as, for example, the insured property owners 115, 120, and 125.

Referring now to FIGS. 1a, 1b, 2, 3a, and 3b, a method 200 for processing an insured property loss is illustrated. The method 200 begins at step 202 where the provider 110 communicates with an insured property owner such as, for example, the insured property owner 115, described above with reference to FIG. 1a. In an embodiment, the provider 110 may communicate with the insured property owner 115 in a variety of ways such as, for example, through the network 105 using, for example, information handling systems such as the information handling system 130, described above with reference to FIG. 1b, through phone communication, through fax communication, through face-to-face communication, and/or through a variety of other communication techniques known in the art. In an embodiment, the insured property owner 115 owns property which is insured by the provider 110 and which has suffered an insured property loss associated with the property. In an embodiment, the insured property owner 115 is a person who is authorized to report an insured property loss for a property owner who owns property which is insured by the provider 110 and which has suffered an insured property loss associated with the property. In an embodiment, the communication between the provider 110 and the insured property owner 115 includes the insured property owner 115 providing, for example, an insurance policy holder name and contact details, a reporting party name and contact details, an insured property loss location, a date and time of the insured property loss, and/or a variety of other preliminary insured property loss information known in the art.

The method 200 then proceeds to step 204 where an insured property loss database is created for the insured property loss. The database creation engine 110c creates a database related to the insured property loss of the insured property owner 115 and stores it in the database 110b. In an embodiment, the database related to the insured property loss of the insured property owner 115 includes the preliminary insured property loss information acquired in step 202 of the method 200 such as, for example, the insurance policy holder name and contact details, the reporting party name and contact details, the insured property loss location, the date and time of the insured property loss, and/or a variety of other preliminary insured property loss information known in the art. In an embodiment, the database creation engine 110c may also search the database 110b and retrieve previously collected information on the insured property owner 115 which may be relevant to the insured property loss.

The method 200 then proceeds to step 206 where the insured property loss is processed. At step 206a of the method 200, at least one insurance policy is associated with the insured property loss. In an embodiment, the insured property owner 115 may have a single insurance policy with the provider 110 which may be associated with the insured property loss. In an embodiment, the insured property owner 115 may have a plurality of insurance policies with the provider 110, at least two which may be associated with the insured property loss. In an embodiment, the association of at least one insurance policy with the insured property loss of step 206 may occur at any time during the method 200.

Figure 3A:
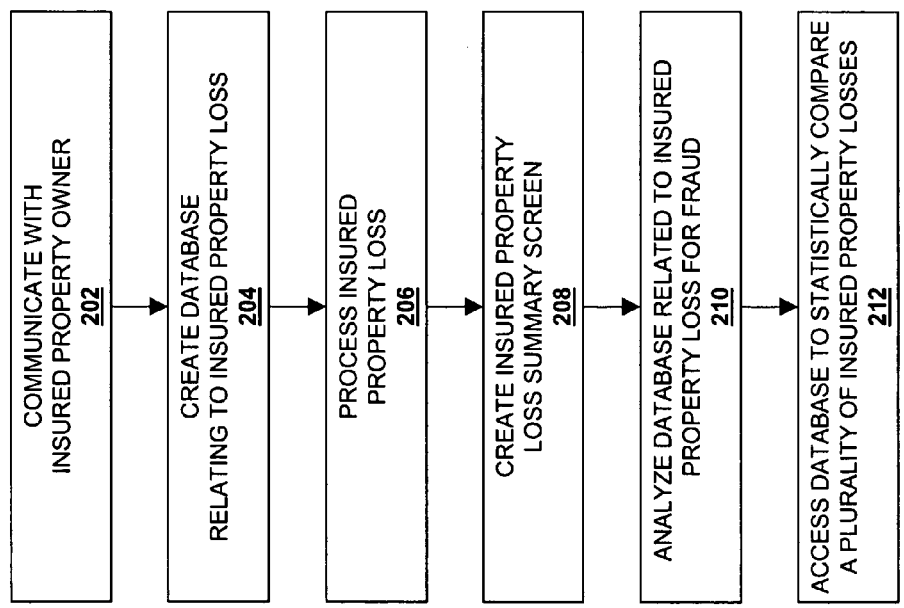
FIG. 3a is a flow chart illustrating an embodiment of a portion of a method for processing an insured property loss.
Figure 3B:
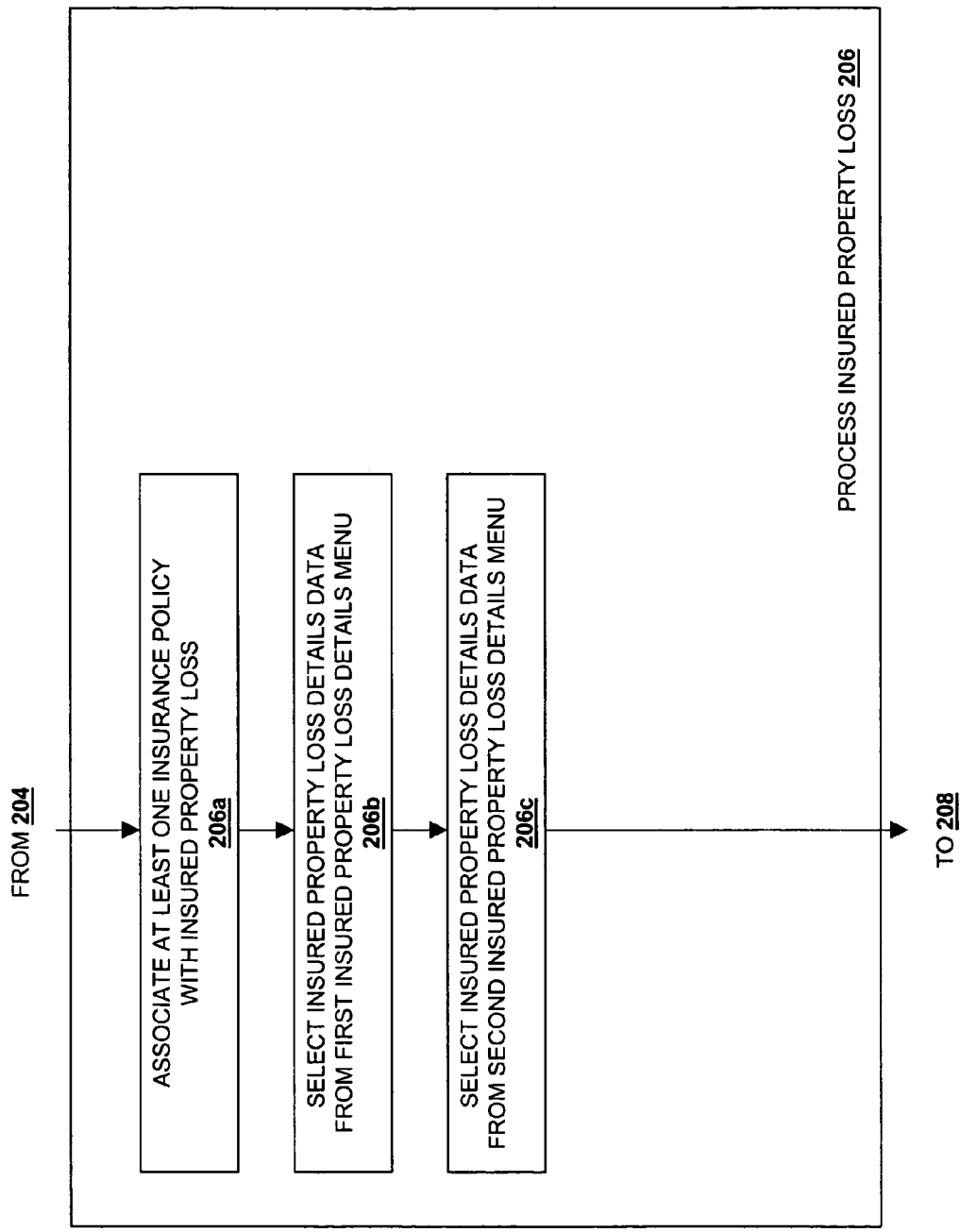
FIG. 3b is a flow chart illustrating an embodiment of a portion of a method for processing an insured property loss.
Figure 3C:
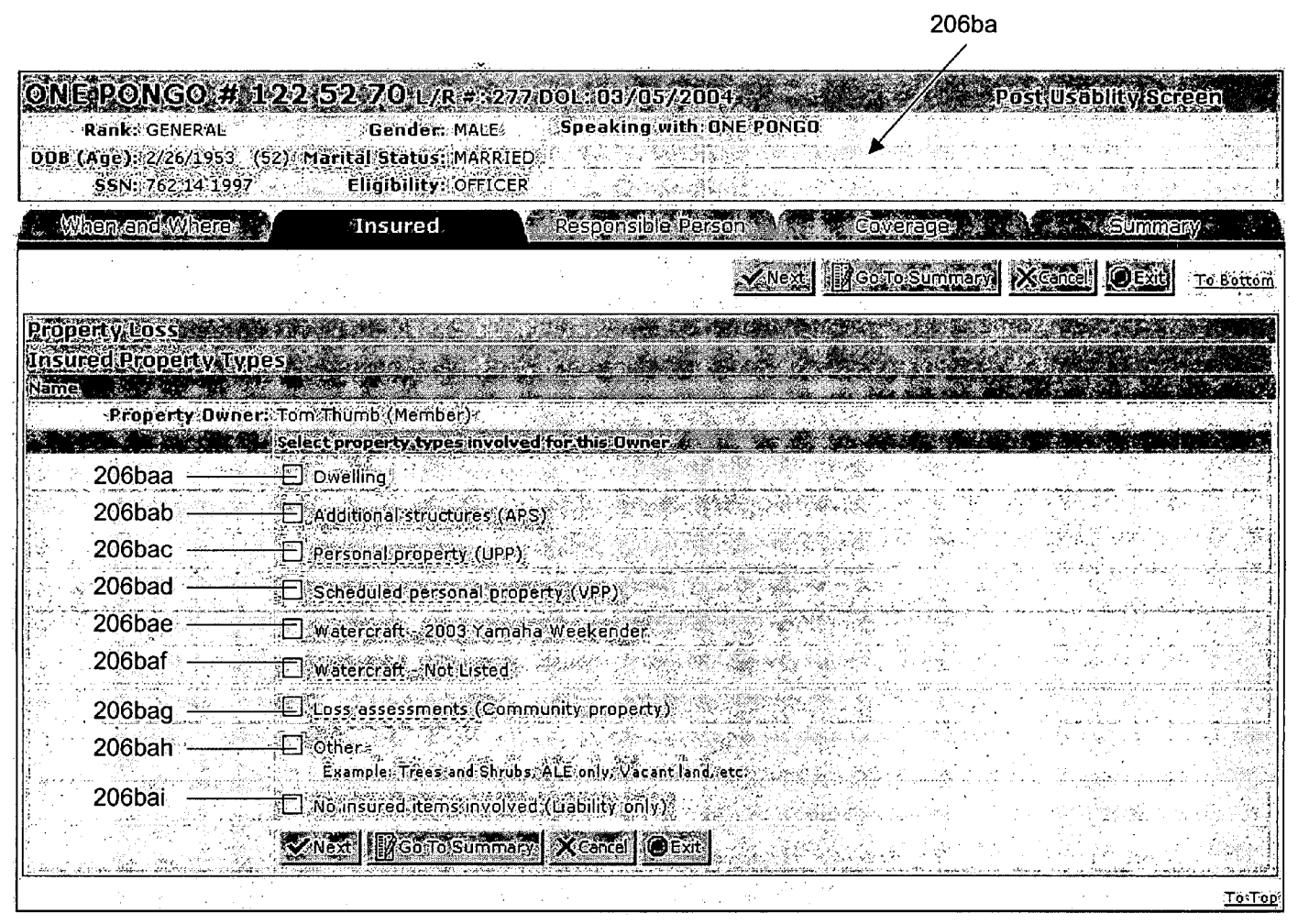
Figure 4A:
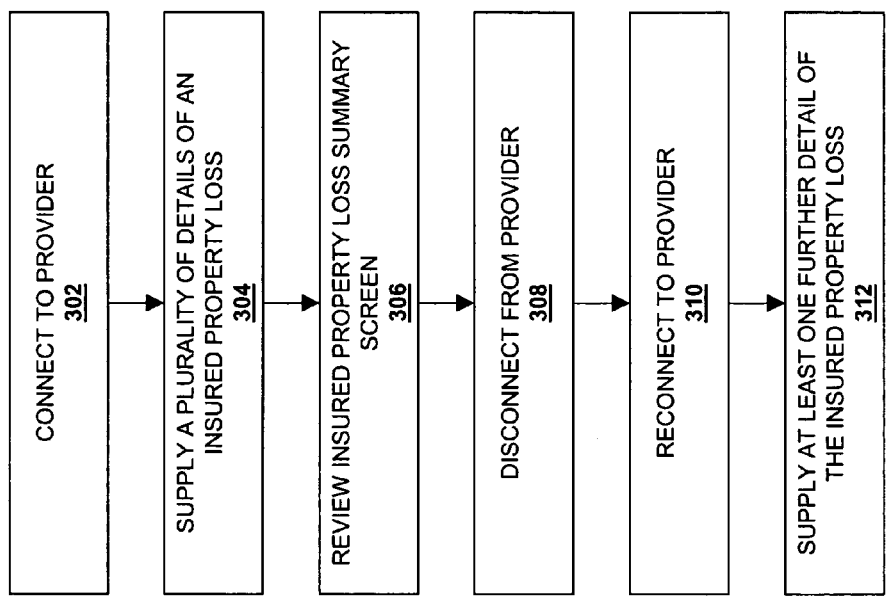
FIG. 4a is a flow chart illustrating an embodiment of a portion of a method for reporting an insured property loss.
Figure 4B:
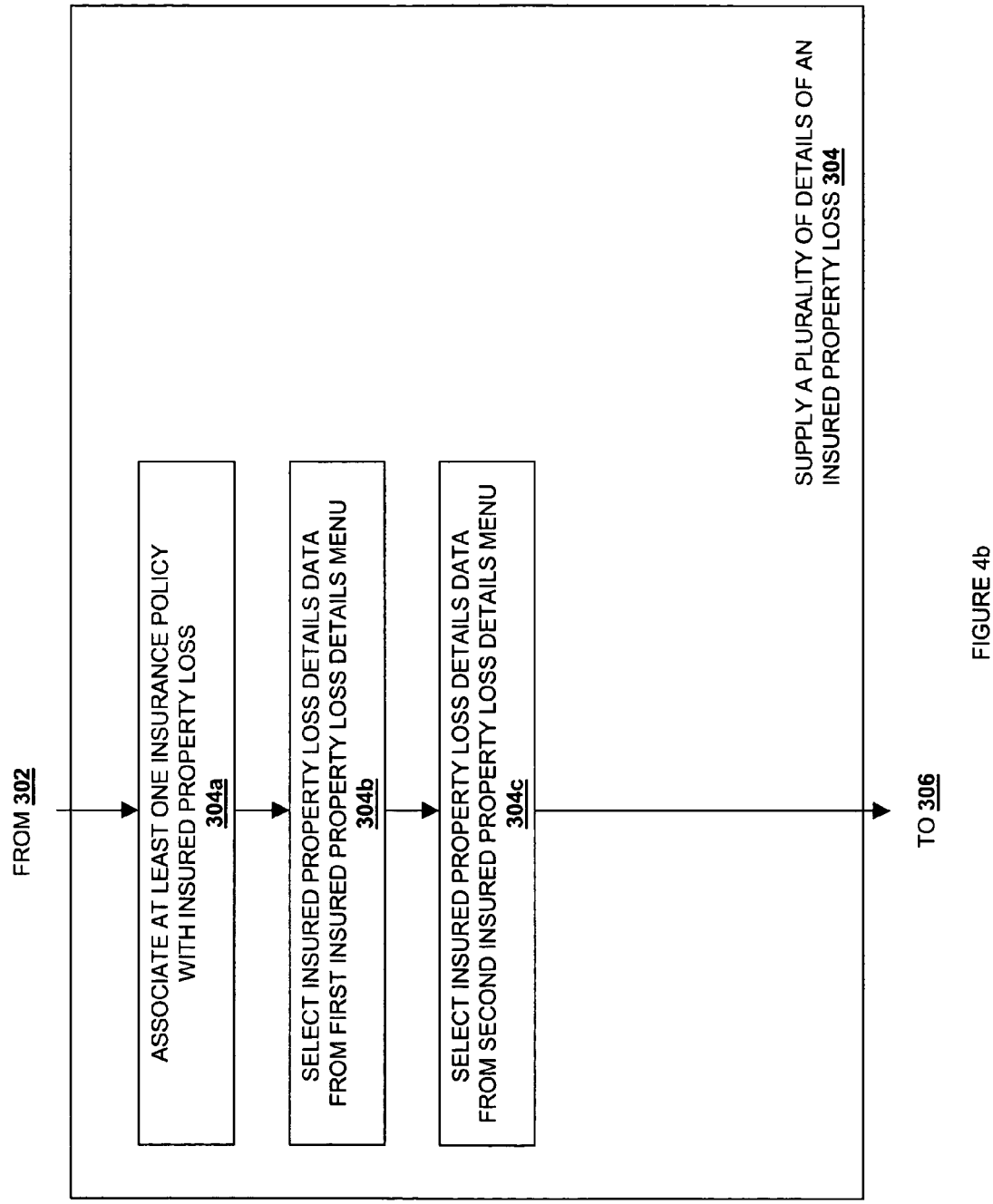
FIG. 4b is a flow chart illustrating an embodiment of a portion of a method for reporting an insured property loss.

Referring now to FIGS. 3a, 3b, and 3c, the method 200 then proceeds to step 206b, where an insured property loss details data is selected from a first structured insured property loss details menu. In an exemplary embodiment, a first structured insured property loss details menu 206ba is provided, as illustrated in FIG. 3c. In an embodiment, the first structured insured property loss details menu 206ba includes a plurality of insured property loss details data that account for a majority of all reported insured property losses such as, for example, 85% of all reported insured property losses. In an embodiment, the first structured insured property loss details menu 206ba includes a plurality of insured property loss details data such as, for example, a dwelling property type 206baa, an additional structures property type 206bab, a personal property type 206bac, scheduled personal property type 206bad, a plurality of watercraft property types 206bae and 206baf, a loss assessments property type 206bag, an other property type 206bah, and a no insured items involved property type 206bai. As the provider 110 communicates with the insured property owner 115 about the insured property loss, the provider 110 may select any or all of the appropriate insured property loss details data to describe the insured property loss experienced by the insured property owner 115, and that data may be entered into the database created for the insured property loss of the insured property owner 115 in step 204. Furthermore, the selection of specific insured property loss details data from the first structured insured property loss details menu 206ba will structure the appearance and order of a plurality of following structured insured property loss details menus in order to provide a logical flow for selecting additional insured property loss details data in order to process the insured property loss in a convenient, structured, and efficient manner.

Figure 3D:
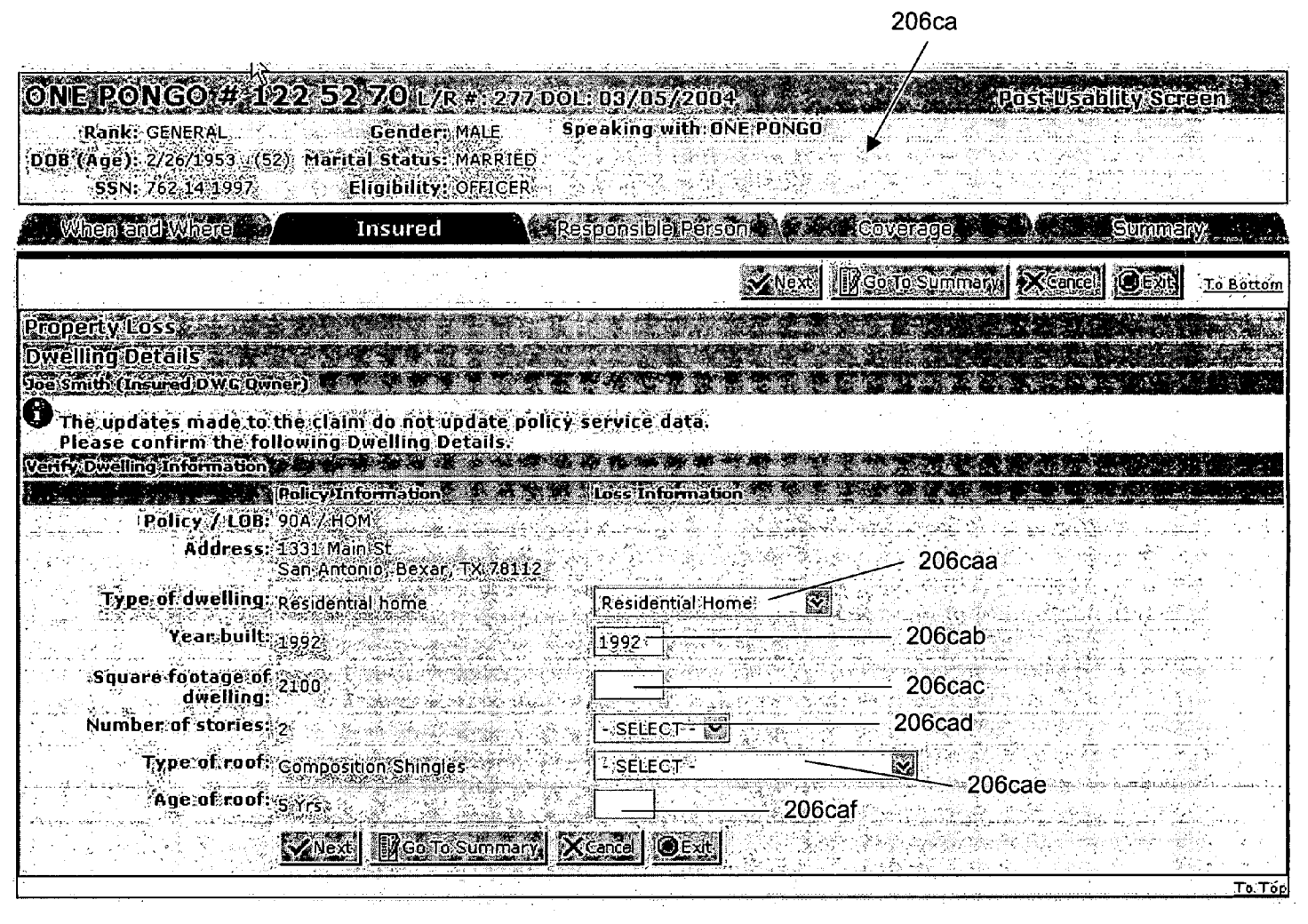

Referring now to FIGS. 3a, 3b, 3c, 3d, and 3e, the method 200 then proceeds to step 206c, where an insured property loss details data is selected from a second structured insured property loss details menu. Depending on the insured property loss details data selected from the first structured insured property loss details menu 206ba, a plurality of different second structured insured property loss details menus may be available, each including a plurality of different insured property loss details data. For example, in an embodiment, if the provider 110 selects the dwelling property type 206baa on the first structured insured property loss details menu 206ba, a second structured insured property loss details menu 206ca is provided, as illustrated in FIG. 3d. The second structured insured property loss details menu 206ca includes a plurality of insured property loss details data such as, for example, a type of dwelling 206caa, a year built 206cab, a square footage of dwelling 206cac, a number of stories 206cad, a type of roof 206cae, and an age of roof 206caf. In an embodiment, the provider 110 may either confirm or modify the insured property loss details data on the second structured insured property loss details menu 206*ca* based on the communications with the insured property owner 115, and that data may be entered into the database created for the insured property loss of the insured property owner 115 in step 204. In an embodiment, the selection of specific insured property loss details data from the second structured insured property loss details menu 206*ca* will structure the appearance and order of a plurality of following structured insured property loss details menus in order to provide a logical flow for selecting additional insured property loss details data in order to process the insured property loss in a convenient, structured, and efficient manner.

Figure 3E:
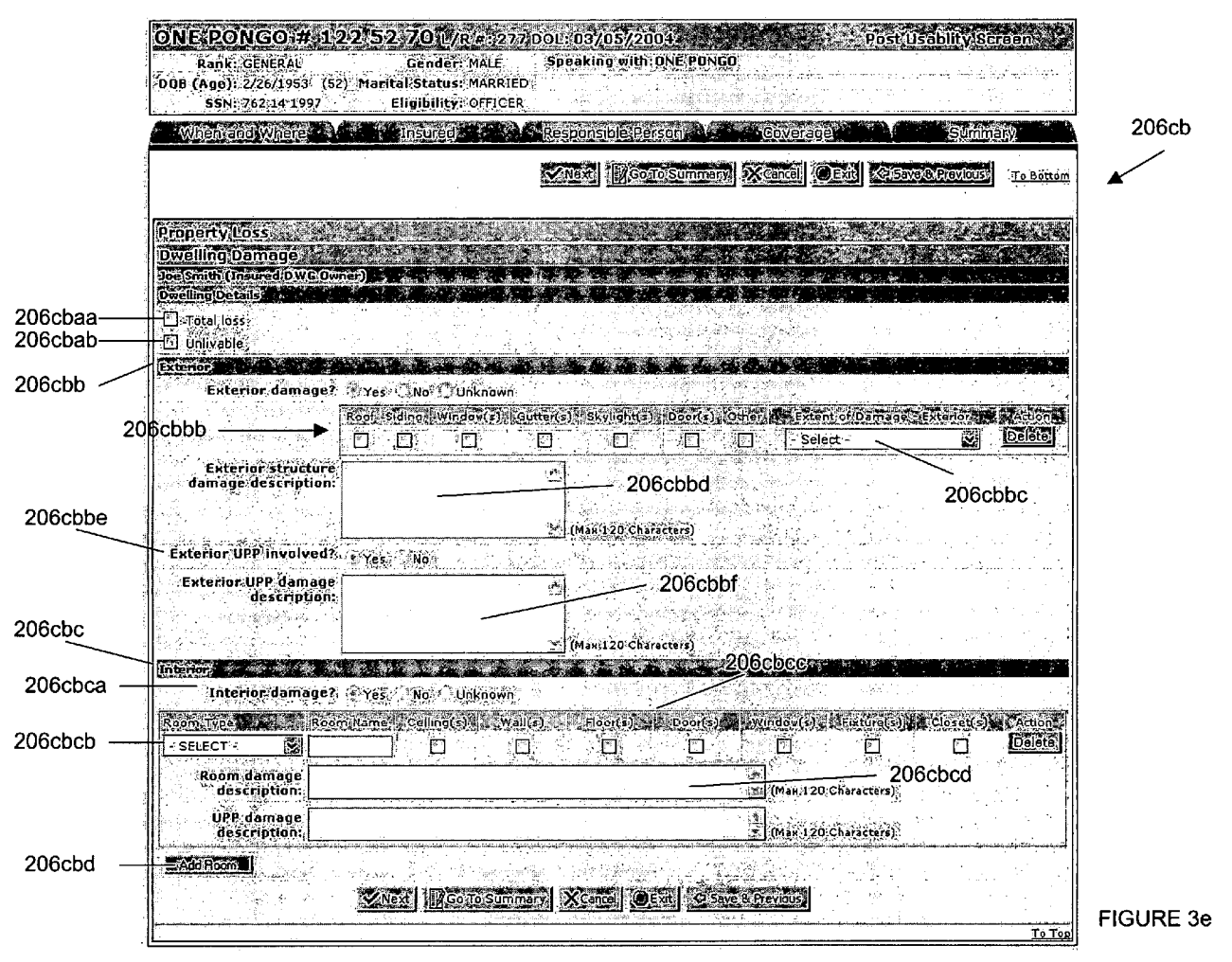

In an embodiment, if the provider 110 selects the dwelling property type 206*baa* on the first structured insured property loss details menu 206*ba*, a second structured insured property loss details menu 206*cb* is provided, as illustrated in FIG. 3*e*. In an embodiment, the second structured insured property loss details menu 206*cb* may follow the second structured insured property loss details menu 206*ca*, described above with reference to FIG. 3*d*, and the insured property loss details data in the second structured insured property loss details menu 206*cb* may vary depending on the insured property loss details data selected in the second structured insured property loss details menu 206*ca* in order to provide a logical flow for selecting additional insured property loss details data in order to process the insured property loss in a convenient, structured, and efficient manner.

In an embodiment, the second structured insured property loss details menu 206*cb* may include a plurality of insured property loss details data such as, for example, a dwelling details 206*cba* which allows the provider 110 to select that the dwelling is either a total loss 206*cbaa* or unliveable 206*cbab*, and that data may be entered into the database created for the insured property loss of the insured property owner 115 in step 204.

In an embodiment, the second structured insured property loss details menu 206*cb* may include a plurality of insured property loss details data such as, for example, an exterior details 206*cbb* which allows the provider 110 to select whether there is exterior damage 206*cbba*, the location 206*cbbb* of the exterior damage including locations such as, for example, a roof, a siding, a window, a gutter, a skylight, and/or a door, an extent of damage 206*cbbc* to the exterior, provide a short description 206*cbbd* of the exterior damage, whether there was exterior personal property damage 206*cbbe*, and provide a short description 206*cbbf* of the exterior personal property damage, and that data may be entered into the database created for the insured property loss of the insured property owner 115 in step 204.

In an embodiment, the second structured insured property loss details menu 206*cb* may include a plurality of insured property loss details data such as, for example, an interior details 206*cbc* which allows the provider 110 to select whether there is interior damage 206*cbca*, the type of room 206*cbcb* damaged, the location 206*cbcc* of the interior damage such as, for example, a ceiling, a wall, a floor, a door, a window, a fixture, and/or a closet, provide a short description 206*cbcd* of the interior damage, and provide a short description 206*cbce* of at least one content in the room which has been damaged, and that data may be entered into the database created for the insured property loss of the insured property owner 115 in step 204. Furthermore, an add room option 206*cbd* is provided which allows additional insured property loss details data available for additional rooms which may have been damaged. In an embodiment, the selection of specific insured property loss details data from the second structured insured property loss details menu 206*cb* will structure the appearance and order of a plurality of following structured insured property loss details menus in order to provide a logical flow for selecting additional insured property loss details data in order to process the insured property loss in a convenient, structured, and efficient manner.

Figure 3F:
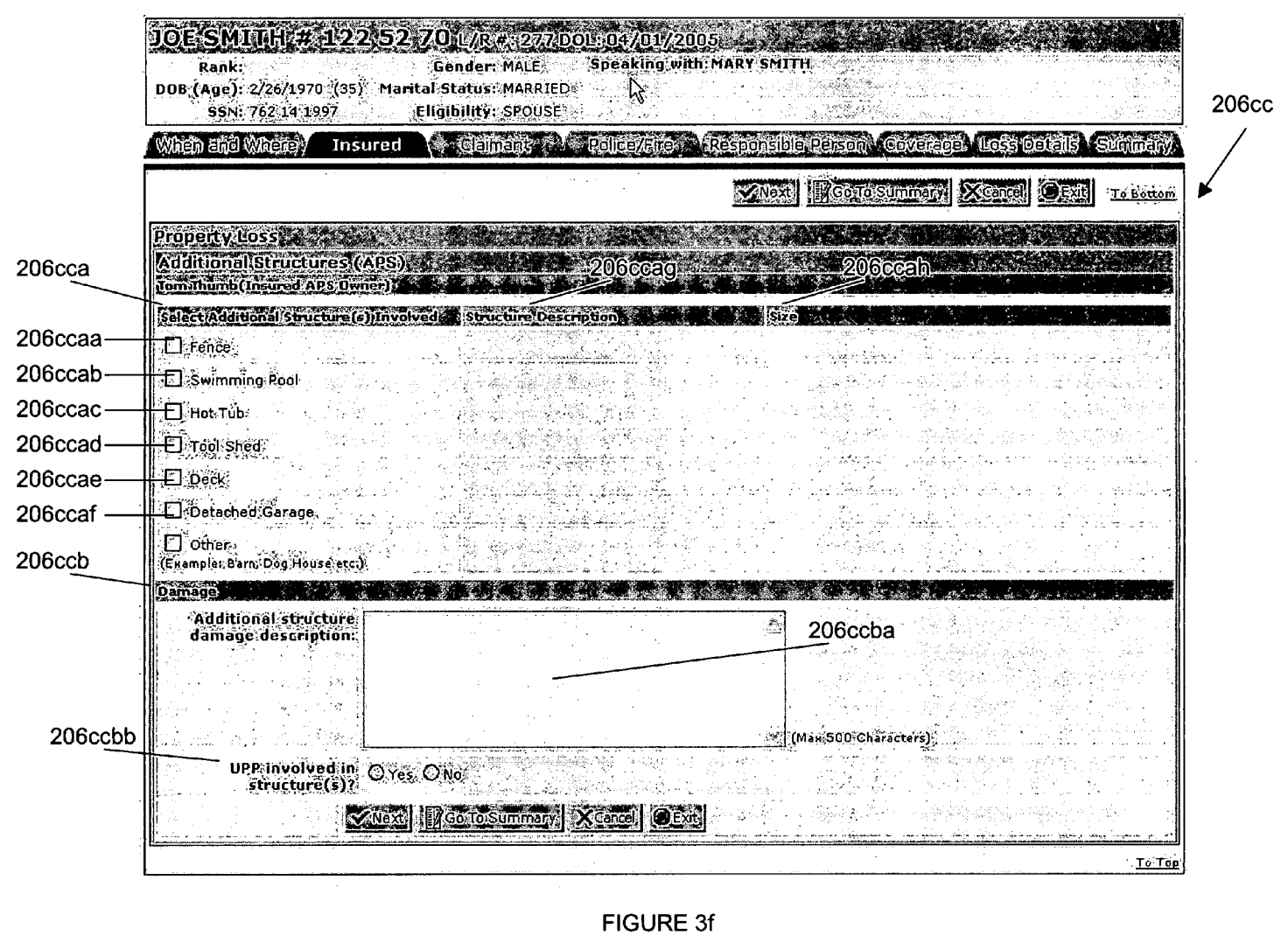

Referring now to FIGS. 3*a*, 3*b*, 3*c*, and 3*f*, if, at step 206*c* of the method 200, the provider 110 selects the additional structures type 206*bab* on the first structured insured property loss details menu 206*ba*, a second structured insured property loss details menu 206*cc* is provided, as illustrated in FIG. 3*f*. In an embodiment, the second structured insured property loss details menu 206*cc* includes a plurality of insured property loss details data such as, for example, a plurality of additional structures involved 206*cca* such as, for example, a fence 206*ccaa*, a swimming pool 206*ccab*, a hot tub 206*ccac*, a tool shed 206*ccad*, a deck 206*ccae*, and a detached garage 206*ccaf*, and a damage 206*ccb* including a short description 206*ccba* of the damage and whether personal property was involved in the structure damage 206*ccbb*. As the provider 110 communicates with the insured property owner 115 about the insured property loss, the provider 110 may select any or all of the appropriate insured property loss details data to describe the insured property loss experienced by the insured property owner 115, and that data may be entered into the database created for the insured property loss of the insured property owner 115 in step 204. In an embodiment, if the provider 110 selects any one of the additional structures involved 206*cca*, additional menus for a structure description 206*ccag* and structure size 206*ccah* appear to allow the provider 110 to provide more detail about the insured property loss. In an embodiment, the selection of specific insured property loss details data from the second structured insured property loss details menu 206*cc* will structure the appearance and order of a plurality of following structured insured property loss details menus in order to provide a logical flow for selecting additional insured property loss details data in order to process the insured property loss in a convenient, structured, and efficient manner.

Figure 3G:
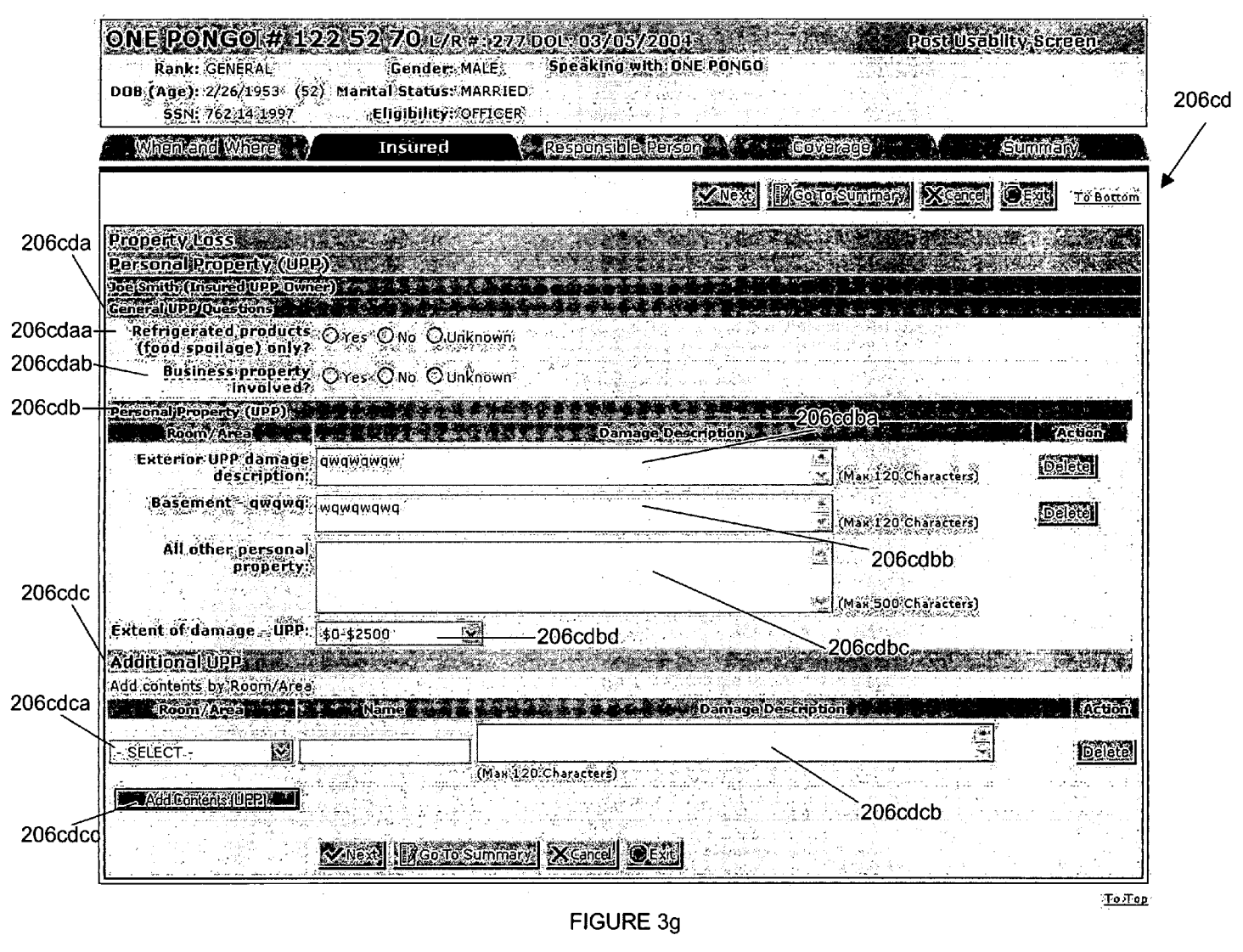

Referring now to FIGS. 3*a*, 3*b*, 3*c*, and 3*g*, if, at step 206*c* of the method 200, the provider 110 selects the personal property type 206*bac* on the first structured insured property loss details menu 206*ba*, a second structured insured property loss details menu 206*cd* is provided, as illustrated in FIG. 3*g*. In an embodiment, the second structured insured property loss details menu 206*cd* includes a plurality of insured property loss details data such as, for example, general data 206*cda* including whether the personal property damage involved refrigerated products only 206*cdaa* and whether business property was involved 206*cdab*. In an embodiment, the second structured insured property loss details menu 206*cd* includes a plurality of insured property loss details data such as, for example, personal property data 206*cdb* which allows the provider 110 to provide a short description 206*cdba* of the exterior personal property damage, to provide a short description 206*cdbb* of the personal property damage in a specific location that may be determined by the insured property loss details data chosen on previous insured property loss details menus, to provide a short description 206*cdbc* of all of the other personal property damage, and to estimate an extent of damage 206*cdbd* for the personal property. In an embodiment, the second structured insured property loss details menu 206*cd* includes a plurality of insured property loss details data such as, for example, additional personal property data 206*cdc* which allows the provider 110 to select a room 206*cdca*, provide a short description 206*cdcb* of the damage to the room, and to add contents of personal property that may have been damaged 206*cdcc* in the room. As the provider 110 communicates with the insured property owner 115 about the insured property loss, the provider 110 may select any or all of the appropriate insured property loss details data to describe the insured property loss experienced by the insured property owner 115, and that data may be entered into the database created for the insured property loss of the insured property owner 115 in step 204. In an embodiment, the selection of specific insured property loss details data from the second structured insured property loss details menu 206*cd* will structure the appearance and order of a plurality of following structured insured property loss details menus in order to provide a logical flow for selecting additional insured property loss details data in order to process the insured property loss in a convenient, structured, and efficient manner.

Figure 3H:
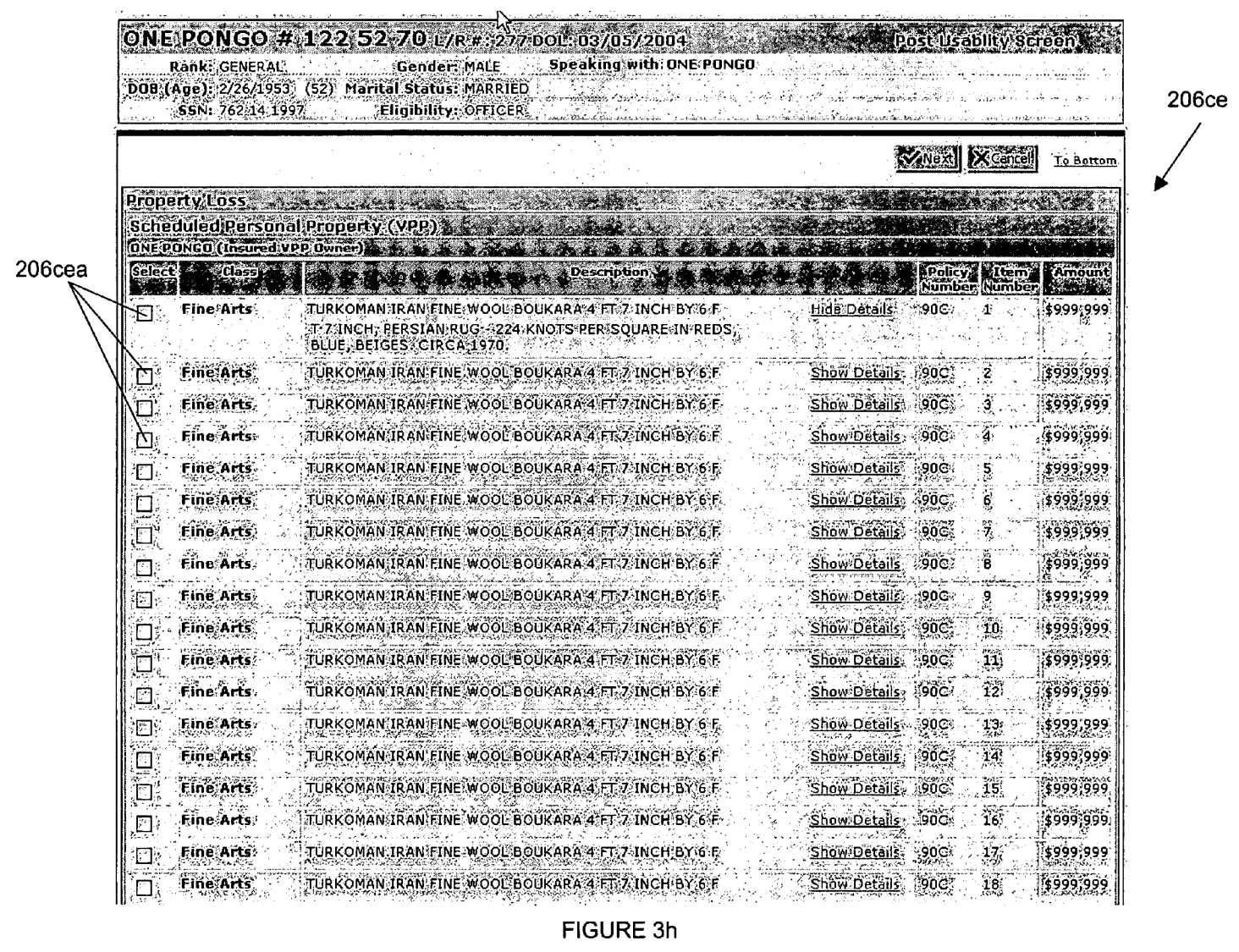

Referring now to FIGS. 3*a*, 3*b*, 3*c*, and 3*h*, if, at step 206*c* of the method 200, the provider 110 selects the scheduled personal property type 206*bad* on the first structured insured property loss details menu 206*ba*, a second structured insured property loss details menu 206*ce* is provided, as illustrated in FIG. 3*h*. In an embodiment, the second structured insured property loss details menu 206*ce* includes a plurality of insured property loss details data such as, for example, a list of a plurality of scheduled personal property items 206*cea*, each which may be selected by the provider 110 if it has been damaged. In an embodiment, the list of a plurality of scheduled personal property items 206*cea* includes all scheduled personal property the insured property owner 115 has registered with the provider 110. As the provider 110 communicates with the insured property owner 115 about the insured property loss, the provider 110 may select any or all of the appropriate insured property loss details data to describe the insured property loss experienced by the insured property owner 115, and that data may be entered into the database created for the insured property loss of the insured property owner 115 in step 204. In an embodiment, the selection of specific insured property loss details data from the second structured insured property loss details menu 206*ce* will structure the appearance and order of a plurality of following structured insured property loss details menus in order to provide a logical flow for selecting additional insured property loss details data in order to process the insured property loss in a convenient, structured, and efficient manner.

In an embodiment, each of the second structured insured property loss details menus 206*ca*, 206*cb*, 206 cc, 206*cd*, and 206*ce*, described above with respect to FIGS. 3*d*, 3*e*, 3*f*, 3*g*, and 3*h*, may in turn structure the appearance and order of a plurality of following structured insured property loss details menus depending on the insured property loss details data selected such that all the details of the insured property loss of the insured property owner 115 may be recorded into the database for the insured property loss of the insured property owner 115. Processing the insured property loss using the fielded data as described above produces dynamic flows for capturing the insured property loss data that change depending on the details of the insured property loss and allow effective interaction and support of other external applications such as, for example, using the data collected to report details of the property loss to a contractor or other entity which is repairing the damaged property, using the data for facilitating payment of the insured property loss by an outside payment system, and using the data to analyze losses over an extended period of time. Thus, a system and method are provided which provide a structured format for processing an insured property loss in an efficient manner such that data is collected quickly and efficiently for an insured property loss which is consistent across a plurality of insured property losses and requires less training to collect than a conventional insured property loss processing system and method.

Figure 3I:
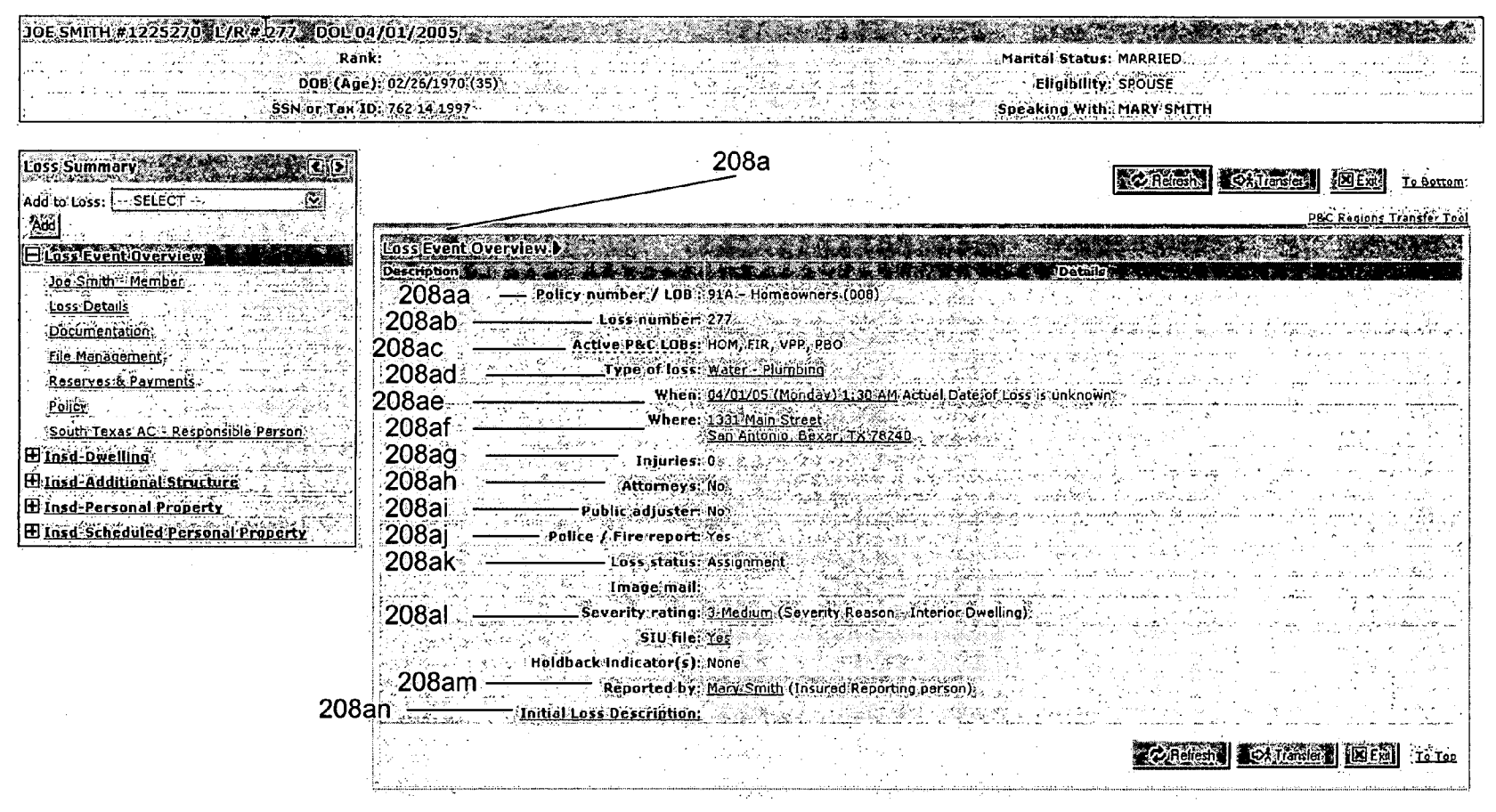

Referring now to FIGS. 2, 3*a*, 3*b*, 3*c*, and 3*i*, the method 200 then proceeds to step 208 where an insured property loss summary screen is created. The insured property loss processing engine 110*a* accesses the data selected in step 206 of the method 200, which may be stored in the database created for the insured property loss of the insured property owner 115, and creates a summary screen which organizes that data. In an embodiment, a loss event summary screen 208*a* is created, as illustrated in FIG. 3*i*. The loss event summary screen 208*a* includes a policy number 208*aa*, a loss number 208*ab*, a policy type 208*ac*, a type of loss 208*ad*, a time of loss 208*ae*, a location of loss 208*af*, a number of injuries 208*ag*, a list of attorney's 208*ah*, a public adjuster 208*ai*, a police/fire report 208*aj*, a loss status 208*ak*, a severity rating 208*al*, a reporting person 208*am*, and/or an initial loss description 208*an*. In an embodiment, a severity rating 208*al* is used to classify losses into groups of losses based on the severity of the loss such as, for example, to prioritize losses to ensure property repair based on need. The summary screen 208*a* provides a convenient format for review of the insured property loss and comparison to other insured property losses.

Figure 3J:
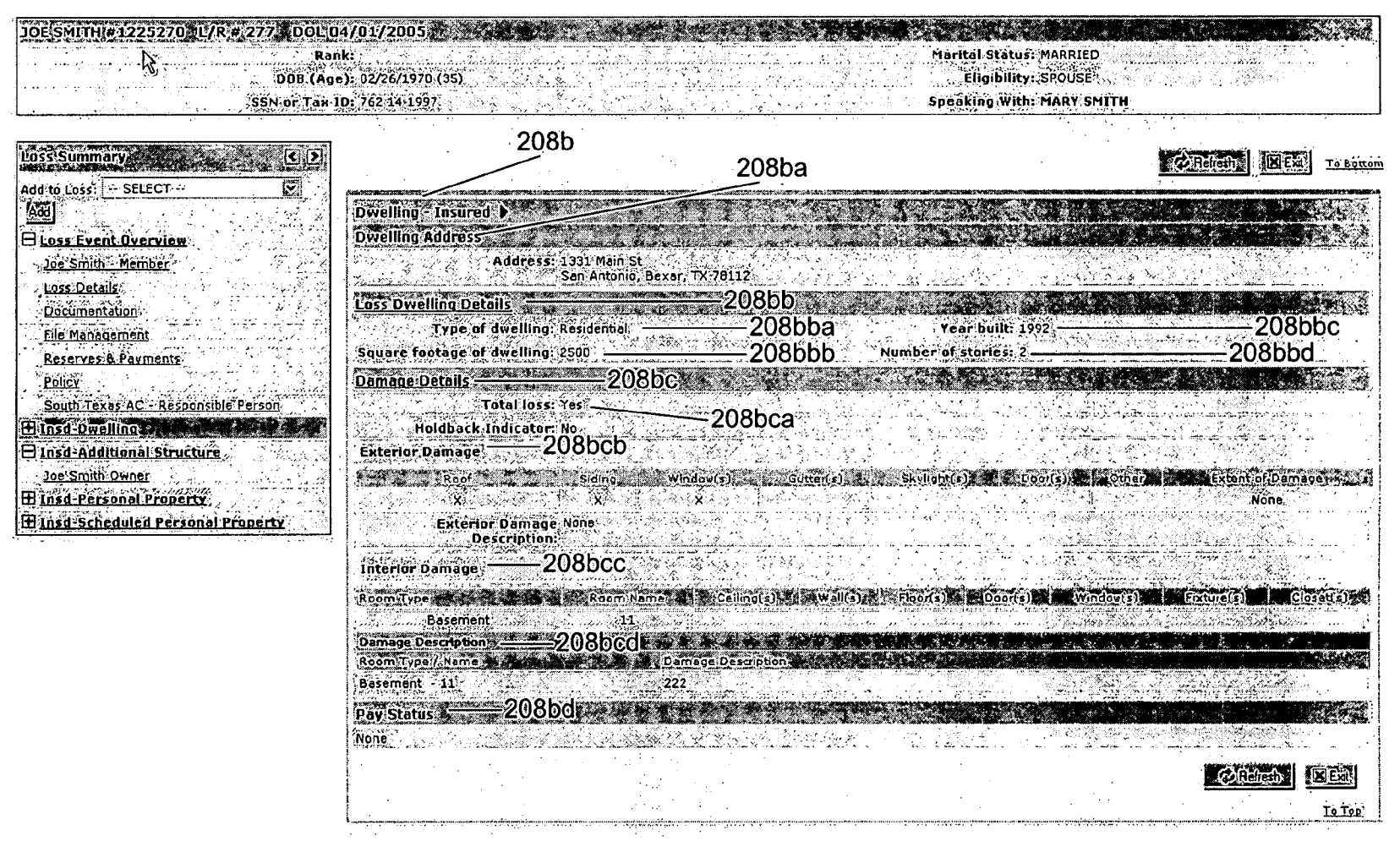

Referring now to FIGS. 2, 3*a*, 3*b*, 3*c*, and 3*j*, in an embodiment, a dwelling loss summary screen 208*b* is created, as illustrated in FIG. 3*j*. The dwelling loss summary screen 208*b* includes a dwelling address 208*ba*, a dwelling details 208*bb* including a type of dwelling 208*bba*, a year built 208*bbb*, a square footage of dwelling 208*bbc*, and number of stories 208*bbd*, a damage details 208*bc* including whether the loss is a total loss 208*bca*, an exterior damage summary 208*bcb*, an interior damage summary 208*bcc*, and a damage description 208*bcd*, and a pay status 208*bd*. The summary screen 208*b* provides a convenient format for review of the insured property loss and comparison to other insured property losses.

Figure 3K:
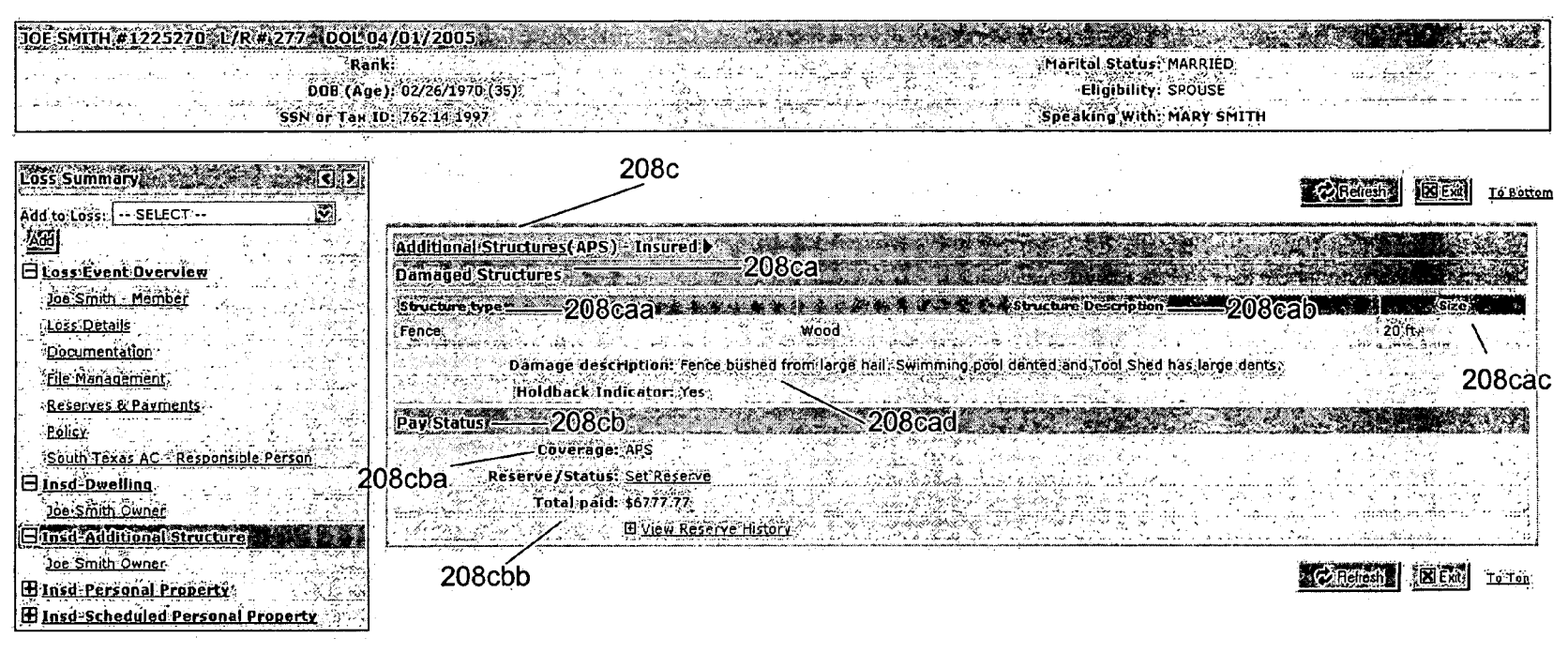

Referring now to FIGS. 2, 3*a*, 3*b*, 3*c*, and 3*k*, in an embodiment, an additional structures summary screen 208*c* is created, as illustrated in FIG. 3*k*. The additional structures summary screen 208*c* includes a damaged structures 208*ca* including a structure type 208*caa*, a structure description 208*cab*, a size 208*cac*, and a damage description 208*cad*, and a pay status 208*cb* including a coverage type 208*cba* and a total paid 208*cbb*. The summary screen 208*c* provides a convenient format for review of the insured property loss and comparison to other property losses. In an embodiment, a plurality of additional summary screens may be created in order to review the different data selected for the insured property loss of the insured property owner 115.

Referring now to FIGS. 2 and 3*a*, the method 200 then proceeds to step 210 where the database is analyzed for fraud. The data analyzing engine 110*d* accesses the database created for the insured property loss of the insured property owner 115 and stored in the database 110*b* and, using methods known in the art, analyzes the selected data to determine whether the insured property loss of the insured property owner 115 is a fraud risk. The method 200 then proceeds to step 212 where the database 110*b* is accessed to statistically compare a plurality of insured property losses. The data analyzing engine 110*d* accesses the database 110*b* and collects a plurality of different databases relating to different insured property losses and, using methods known in the art, statistically compares those insured property losses.

Referring now to FIGS. 1*a*, 1*b*, 4*a*, and 4*b*, in an embodiment, a method 300 for reporting an insured property loss is illustrated. The method 300 begins at step 302 where an insured property owner connects to a provider. An insured property owner such as, for example, the insured property owner 115, connects to the provider 110 over the network 105 and through an internet site using a information handling system such as, for example, the information handling system 130. The method 300 then proceeds to step 304 where the insured property owner 115 supplies a plurality of details of an insured property loss. At step 304a, the insured property owner 115 associates at least one insurance policy with the insured property loss. The provider 110 provides the internet site with which the insured property owner 115 interacts. The insured property owner 115 may then provide information on that internet site such as, for example, an insurance policy holder name and contact details, a reporting party name and contact details, an insured property loss location, a date and time of the insured property loss, and/or a variety of other preliminary insured property loss information known in the art, along with selecting at least one insurance policy to associate with the insured property loss.

The method 300 then proceeds to steps 304b and 304c, where the insured property owner 115 selects insured property loss details data from a first structured insured property loss details menu and then selects insured property loss details data from a second structured insured property loss details menu. Steps 304b and 304c of the method 300 are substantially similar in operation to steps 206b and 206c of the method 200, described above with respect to FIGS. 3a and 3b, with the provision that the insured property owner 115 selects the insured property loss details data in place of the provider 110, with the insured property loss details data selected by the insured property owner through an Internet site. In an embodiment, the insured property loss details data may be selected by the insured property owner 115 from structured insured property loss details menus such as the structured insured property loss details menus 206ba, 206ca, 206cb, 206cc, 206cd, and 206ce, described above with respect to FIGS. 3c, 3d, 3e, 3f, 3g, and 3h, which operate in the same manner to provide a structured format for reporting an insured property loss in an efficient manner such that data is collected quickly and efficiently for an insured property loss which is consistent across a plurality of insured property losses. The insured property owner 115 may select insured property loss details data from the plurality of structured insured property loss details menus in order to report all the details of the insured property loss.

The method 300 then proceeds to step 306 where the insured property owner 115 reviews an insured property loss summary screen. Upon reporting all the details of the insured property loss, the internet site collects that data and organizes the data into insured property loss summary screens which the insured property owner 115 may review to ensure that the insured property loss has been reported accurately. In an embodiment, the insured property loss summary screens may be substantially similar to the insured property loss summary screens 208a, 208b, and 208c, described above with respect to FIGS. 3i, 3j, and 3k. The method 300 then proceeds to step 308 where the insured property owner 115 disconnects from the provider 308. The method 300 then proceeds to step 310 where the insured property owner 115 reconnects to the provider 110 over the network 105 using a information handling system such as, for example, the information handling system 130. The method 300 then proceeds to step 312 where the insured property owner 115 supplies at least one further detail of the insured property loss by accessing one of the structured insured property loss details menus and either modifying an insured property loss details data previously entered, or supplying an insured property loss details data not previously supplied.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system for processing an insured property loss, the system comprising:
   a network interface for communicating via a network with an insured property owner;
   an input device coupled to an information database comprising previously collected information on the insured property owner;
   a database creation engine for creating an insured property loss database related to an insured property loss of the insured property owner, the database creation engine coupled to the information database; and
   an insured property loss processing engine for processing an insured property loss of the insured property owner, wherein the insured property loss processing engine is coupled to the information database, the processing comprising:
      the database creation engine searching the information database, retrieving the previously collected information on the insured property owner, and including the previously collected information in the insured property loss database; and
      recording a plurality of details of the insured property loss in the insured property loss database electronically by using the input device to select a plurality of insured property loss details data from a plurality of structured insured property loss detail menus, wherein the plurality of structured insured property loss detail menus comprise a first structured insured property loss detail menu that provides a list of multiple types of property insured by the insurance provider wherein a user selects a type of property from the list based upon the one or more types of insured property that have been involved in the insured property loss and a second structured insured property loss detail menu and the selection of first insured property loss detail data on the first structured insured property loss detail menu determines the availability of second insured property loss detail data on the second structured insured property loss detail menu wherein the second structured insured property loss detail menu provides a list of multiple types of property descriptions wherein a user selects a description from the list based upon the one or more types of property that have been selected from the first structured insured property loss detail menu, and wherein the second insured property loss detail data comprises the previously collected information; and
   a data analyzing engine for statistically comparing the insured property loss of the insured property owner with a plurality of other insured property losses.

2. The system of claim 1 wherein the insured property loss processing engine is operable to organize the selected insured property loss details data into at least one insured property loss summary screen.

3. The system of claim 1 further comprising:
a data analyzing engine for analyzing the selected insured property loss details data to detect fraud.

4. The system of claim 1 wherein the processing further comprises:
selecting from the first structured insured property loss detail menu that a first insured property has been damaged and selecting from the second structured insured property loss detail menu an extent of damage of the first insured property.

5. The system of claim 1 wherein the processing further comprises:
selecting from the first structured insured property loss detail menu first insured property loss detail data indicating that a room has been damaged; and
selecting from the second structured insured property loss detail menu second insured property loss detail data indicating that at least one content in the room has been damaged.

6. The system of claim 1 wherein the processing further comprises:
associating a plurality of insurance policies with the insured property loss.

7. The system of claim 1 wherein the database creation engine is operable to include a plurality of confirmed second insured property loss detail data in the insured property loss database.

8. The system of claim 1 wherein the multiple types of property in the list of multiple types of property insured by the insurance provider are types of physical property.

9. The system of claim 8, wherein the types of physical property comprise a dwelling, a personal property, or a watercraft.

10. A computer implemented method for processing an insured property loss, the method comprising;
communicating with an insured property owner by coupling a insured property owner network to an insurance provider network; and
processing an insured property loss of the insured property owner with the insurance provider computer system, the processing comprising:
retrieving previously collected information on the insured property owner and creating an insured property loss database by a database creation engine, that corresponds to the insured property loss and includes the previously collected information;
recording a plurality of details of the insured property loss in the insured property loss database electronically by using an input device coupled to an information handling system to select a plurality of insured property loss details data from a plurality of structured insured property loss detail menus that are provided using computer-executable instructions located on a computer-readable medium in the information handling system, wherein the plurality of structured insured property loss detail menus comprise a first structured insured property loss detail menu that provides a list of multiple types of property insured by the insurance provider wherein a user selects a type of property from the list based upon the one or more types of insured property that have been involved in the insured property loss and a second structured insured property loss detail menu and the selection of first insured property loss detail data on the first structured insured property loss detail menu determines the availability of second insured property loss detail data on the second structured insured property loss detail menu wherein the second structured insured property loss detail menu provides a list of multiple types of property descriptions wherein a user selects a description from the list based upon the one or more types of property that have been selected from the first structured insured property loss detail menu, and wherein the second insured property loss detail data comprises the previously collected information; and
statistically comparing the insured property loss of the insured property owner with a plurality of other insured property losses.

11. The method of claim 10 wherein the element of processing an insured property loss of the insured property owner further comprises:
organizing the selected insured property loss details data into at least one insured property loss summary screen.

12. The method of claim 10 wherein the element of processing an insured property loss of the insured property owner further comprises:
analyzing the selected insured property loss details data to detect fraud.

13. The method of claim 10 wherein the element of recording a plurality of details of the insured property loss comprises selecting from the first structured insured property loss detail menu that a first insured property has been damaged and selecting from the second structured insured property loss detail menu an extent of damage of the first insured property.

14. The method of claim 10 wherein the element of recording a plurality of details of the insured property loss comprises:
selecting from the first structured insured property loss detail menu a first insured property loss detail data indicating that a room has been damaged; and
selecting from the second structured insured property loss detail menu a second insured property loss detail data indicating that at least one content in the room has been damaged.

15. The method of claim 10 wherein the element of processing an insured property loss of the insured property owner further comprises:
associating a plurality of insurance policies with the insured property loss.

16. The method of claim 10 further comprising:
including a plurality of confirmed second insured property loss detail data in the insured property loss database.

17. The method of claim 10 wherein the multiple types of property in the list of multiple types of property insured by the insurance provider are types of physical property.

18. The method of claim 17, wherein the types of physical property comprise a dwelling, a personal property, or a watercraft.

19. A non-transitory computer-readable medium comprising computer-readable instructions for processing an insured property loss, said computer-readable instructions, when executed by a computer, causing the computer to:
communicate with an insured property owner; and
process an insured property loss of the insured property owner, the processing comprising:
retrieving previously collected information on the insured property owner and creating an insured property loss database that includes the previously collected information;
recording a plurality of details of the insured property loss in the insured property loss database electronically by using an input device coupled to an information handling system to select a plurality of insured property loss details data from a plurality of structured insured property loss detail menus that are provided using computer-executable instructions located on the computer-readable medium of the information handling system, wherein the plurality of structured insured property loss detail menus comprise a first structured insured property loss detail menu that provides a list of multiple types of property insured by the insurance provider wherein a user selects a type of property from the list based upon the one or more types of insured property that have been involved in the insured property loss and a second structured insured property loss detail menu and the selection of first insured property loss detail data on the first structured insured property loss detail menu determines the availability of second insured property loss detail data on the second structured insured property loss detail menu wherein the second structured insured property loss detail menu provides a list of multiple types of property descriptions wherein a user selects a description from the list based upon the one or more types of property that have been selected from the first structured insured property loss detail menu, and wherein the second insured property loss detail data comprises the previously collected information; and
statistically comparing the insured property loss of the insured property owner with a plurality of other insured property losses.

20. The computer-readable medium of claim 19 further comprising computer-readable instructions whereby the element of processing an insured property loss of the insured property owner comprises instructions for:
organizing the selected insured property loss details data into at least one insured property loss summary screen.

21. The computer-readable medium of claim 19 further comprising computer-readable instructions whereby the element of processing an insured property loss of the insured property owner comprises instructions for:
analyzing the selected insured property loss details data to detect fraud.

22. The computer-readable medium of claim 19 further comprising computer-readable instructions whereby the element of recording a plurality of details of the insured property loss comprises instructions for selecting from the first structured insured property loss detail menu that a first insured property has been damaged and selecting from the second structured insured property loss detail menu an extent of damage of the first insured property.

23. The computer-readable medium of claim 19 further comprising computer-readable instructions whereby the element of recording a plurality of details of the insured property loss comprises instructions for:
selecting from the first structured insured property loss detail menu a first insured property loss detail data indicating that a room has been damaged; and
selecting from the second structured insured property loss detail menu a second insured property loss detail data indicating that at least one content in the room has been damaged.

24. The computer-readable medium of claim 19 further comprising computer-readable instructions whereby the element of processing an insured property loss of the insured property owner comprises instructions for:
associating a plurality of insurance policies with the insured property loss.

25. The computer-readable medium of claim 19 further comprising computer-readable instructions comprising instructions for:
including a plurality of confirmed second insured property loss detail data in the insured property loss database.

26. The computer-readable medium of claim 19 wherein the multiple types of property in the list of multiple types of properly insured by the insurance provider are types of physical property.

27. The computer-readable medium of claim 26, wherein the types of physical property comprise a dwelling, a personal property, or a watercraft.

* * * * *